(12) United States Patent
Sedlak

(10) Patent No.: US 6,182,217 B1
(45) Date of Patent: Jan. 30, 2001

(54) ELECTRONIC DATA-PROCESSING DEVICE AND SYSTEM

(75) Inventor: Holger Sedlak, Egmating (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/390,493

(22) Filed: Sep. 3, 1999

Related U.S. Application Data

(63) Continuation of application No. PCT/DE98/00488, filed on Feb. 18, 1998.

(30) Foreign Application Priority Data

Mar. 3, 1997 (DE) ................................. 197 08 616

(51) Int. Cl.⁷ ..................................................... G06F 11/30
(52) U.S. Cl. .......................... 713/172; 713/185; 713/190; 713/201; 380/44; 380/28; 380/255
(58) Field of Search ..................................... 713/172, 185, 713/190, 193, 201, 202; 380/44, 28, 255

(56) References Cited

U.S. PATENT DOCUMENTS

| | | |
|---|---|---|
| 4,672,182 | 6/1987 | Hirokawa . |
| 4,985,921 | 1/1991 | Schwartz . |
| 5,237,616 | 8/1993 | Abraham et al. . |
| 5,347,580 * | 9/1994 | Molva et al. ............................ 380/25 |
| 5,544,246 * | 8/1996 | Mandelbaum et al. ................. 380/23 |
| 5,577,122 * | 11/1996 | Schipper et al. ........................ 380/28 |
| 5,623,637 * | 4/1997 | Jones et al. ............................ 711/164 |

FOREIGN PATENT DOCUMENTS

| | | |
|---|---|---|
| 41 39 060 A1 | 6/1993 | (DE) . |
| 0 337 185 B1 | 10/1989 | (EP) . |
| 0 752 635 A1 | 1/1997 | (EP) . |

OTHER PUBLICATIONS

International Publication No. WO 95/16238 (Jones et al.), dated Jun. 15, 1995.

* cited by examiner

*Primary Examiner*—Thomas R. Peeso
(74) *Attorney, Agent, or Firm*—Herbert L. Lerner; Laurence A. Greenberg; Werner H. Stemer

(57) ABSTRACT

The electronic data-processing device has a processing unit which is connected to one or more memories via a bus. The processing unit has an encryption unit associated with it. One or more secret keys are stored in the one or more memories. All security-related data, and possibly other data as well, are stored in encrypted form in the memory or memories. A comparator compares the stored secret key with a keyword input by a user. The comparator drives a switching unit which in turn drives the encryption unit. Stored data are decrypted only if the comparison is positive.

8 Claims, 2 Drawing Sheets

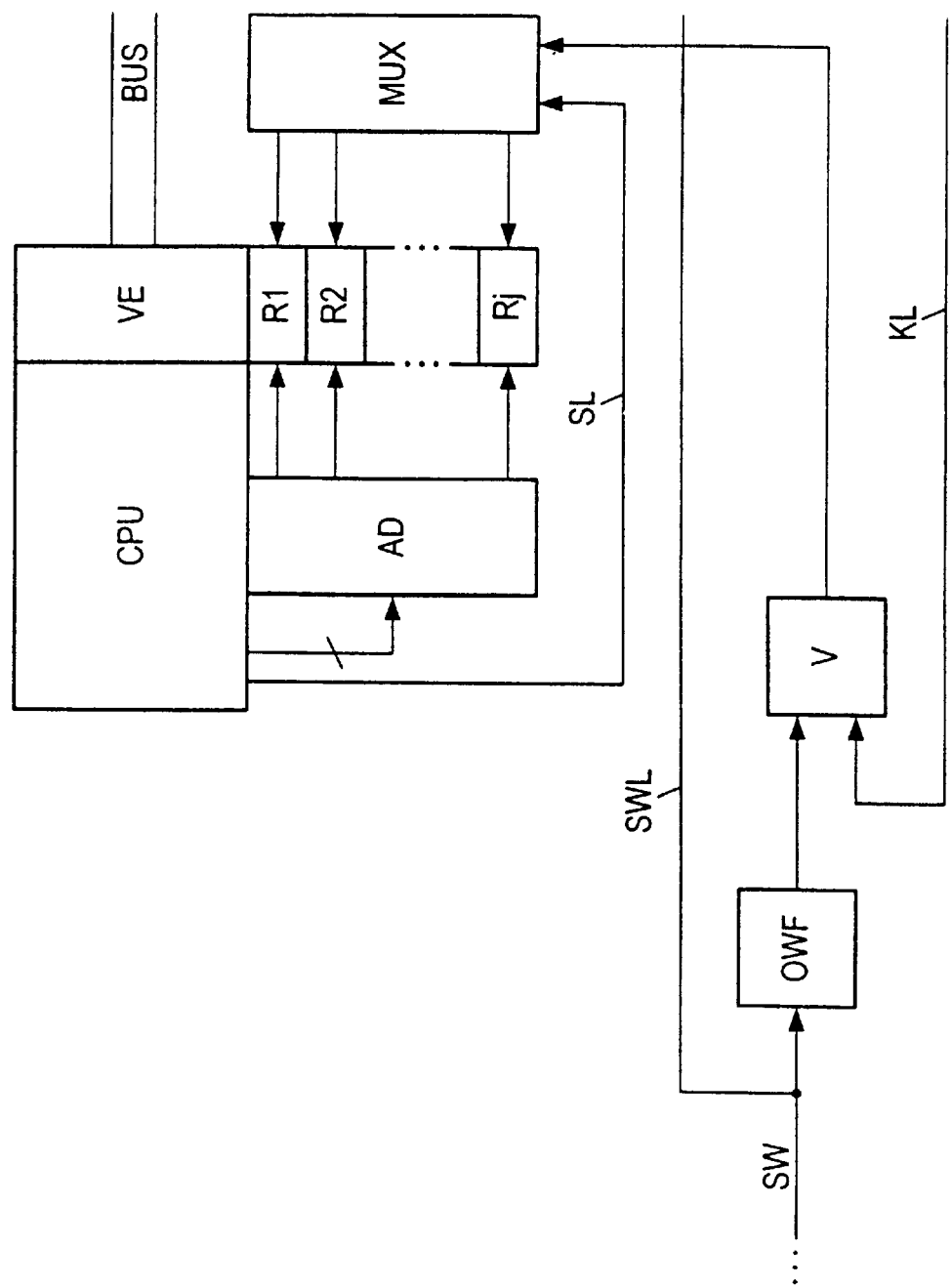

ELECTRONIC DATA-PROCESSING DEVICE AND SYSTEM

CROSS-REFERENCE TO RELATED APPLICATION

This is a continuation of copending International Application PCT/DE98/00488, filed Feb. 18, 1998, which designated the United States.

BACKGROUND OF THE INVENTION

Field of the Invention

The invention lies in the electronics field. Specifically, the invention relates to an electronic data-processing device with a processing unit, such as a microprocessor, at least one data memory, and a bus running between the data memory and the processing unit. The invention also relates to an electronic data-processing system equipped with such a data-processing device.

Electronic data-processing devices of this generic type are frequently used for applications in which security is critical. The data memory is thereby used to store confidential data, monetary values and access authorizations, which are processed by the processing unit in response to an external request, for example.

Since the memory contains information to which, as far as possible, it should not be possible to gain access from outside, it is necessary to provide security measures against manipulation of the electronic data-processing device.

If an electronic data-processing device of the generic type is implemented as an integrated circuit, the circuit can be covered with various passivation layers. The passivation layers can then be applied such that removing a passivation layer results in the destruction of the data memory. Furthermore, the data memory can be buried in lower layers of the integrated circuit, so that it becomes more difficult to access.

A further possibility for protecting an electronic data-processing device against undesirable manipulation is to use sensors which sample operating conditions in the electronic data-processing device. As soon as a value sampled by a sensor lies outside a normal value, appropriate security measures are initiated which cause the electronic data-processing device to be deactivated or else cause the data memory to be erased.

In addition, there are also software sensors which monitor the operation of the processing unit for prohibited commands or for access to address ranges which are blocked for proper use. Furthermore, the access sequence can be monitored to ensure that it is correct.

Finally, it is also conventional practice to permit access only in a special manufacturing mode, and to use special hardware devices, such as severable connection tracks, to restrict memory access by the processing unit to the data memory.

Despite the security measures listed above, electronic data-processing devices of the generic type can occasionally be subjected to undesirable manipulation.

SUMMARY OF THE INVENTION

It is accordingly an object of the invention to provide an electronic data-processing device of the generic type and an electronic data-processing system, which overcomes the above-mentioned disadvantages of the heretofore-known devices and methods of this general type and which is provided improved protection against undesirable changes to and/or surveillance of memory contents.

With the foregoing and other objects in view there is provided, in accordance with the invention, an integrated electronic data-processing device, comprising: at least one memory storing at least one secret key in encoded form, a processing unit, and a bus connecting the processing unit to the at least one memory;

an encryption and decryption unit connected to the processing unit;

a comparator connected between the at least one memory and the encryption and decryption unit for comparing the stored secret key with a keyword input by a user;

a switching unit connected to and driven by the comparator, the switching unit driving the encryption unit and selectively enabling data to be stored to be encrypted and stored data to be decrypted only upon a positive comparison in the comparator; and the switching unit passing the keyword input by the user through to the encryption unit for encryption and decryption.

In other words, the objects of the invention are satisfied with the integrated circuit implementing an electronic data-processing device with a processing unit connected to at least one memory via a bus. The processing unit has an encryption unit associated with it, at least one secret key being stored in the memory or one of the memories. At least all the security-related data is stored in encrypted form in the memory or memories. The comparator compares the stored secret key with a user-input keyword and, upon a positive comparison (i.e., the user's keyword is authorized), drives a switching unit which drives the encryption unit to decrypt stored data.

The invention is based on the knowledge, essential to the invention, that new technical methods have made it easier to manipulate, in particular, electronic data-processing devices designed as integrated circuits. Hence, from the viewpoint of a hacker manipulator, an electronic data-processing device in an integrated circuit can no longer be regarded in its entirety merely as a chip, but is to be regarded as a system which comprises individual components on a silicon substrate and in which the components can be accessed separately.

Accordingly, it is possible to make inferences about the information stored in the data memory by observing the data interchange on the data bus or by reading the data memory, so that manipulation is simplified and memory contents which should actually be kept secret can be accessed in this way.

On the basis of further knowledge essential to the invention, much manipulation of the electronic data-processing devices of this generic type can be attributed to the fact that it has been possible to "tap" the data interchange on the data bus, so that program execution in the processing unit can be observed and understood, which is undesirable.

In one possible embodiment of the invention, the encryption unit is designed such that data interchange on the data bus can be encrypted using an encryption algorithm. An encryption unit designed in this way affords the advantage that it can be mass-produced particularly inexpensively. However, encryption with an algorithm still takes a long time today because it requires numerous calculations in the processing unit.

In another embodiment of the invention, the processing unit is designed such that data interchange on the data bus can be encrypted by means of hardware encryption. With hardware encryption, in particular, it is possible for the data-processing devices according to the invention to be operated in real time very easily, specifically both in the case of read and write access to the data memory.

According to the invention, hardware encryption can be performed using an encryption unit which is designed such that the significance of individual bits of the data interchange can be changed selectively. Bits stored in the memory as LOW, for example, then appear as HIGH in the data interchange on the data bus. This can be done, for example, using an encryption unit having at least one EXOR gate.

In a further possible embodiment of the invention, the encryption unit can be designed such that the connection sequence of data lines in the data bus can be changed selectively. This is outwardly expressed as if individual bit lines of the data bus were interchanged.

Finally, hardware encryption in the data-processing device according to the invention can also be performed by an encryption unit which is designed such that at least some of the data interchange between the data bus and the processing unit and/or between the data bus and the data memory can be delayed selectively. This feigns data interchange, on the data bus, which bears no relation to the current operating status of the electronic data-processing device according to the invention.

In this regard, an essential feature of the data-processing device according to the invention is that the encryption unit is designed such that encryption works selectively. This does not merely mean that there is the option of encryption taking place or not taking place. In addition, according to the invention, it also means that there is the ability to change between different keys for encrypting the data interchange. In this case, the use of the encryption unit according to the invention is attributed dynamic behavior.

In accordance with an added feature of the invention, the at least one memory is a ROM, an EEPROM, a flash memory, or a FRAM memory. Combinations of these memory devices are also within the scope of the invention.

In the case of the inventive data-processing device having changing keys, in particular, data-processing devices from one production lot each receive different individual keys. This ensures that even if the key for one data-processing device is known, it is still not possible to deduce the keys for other data-processing devices. In addition, for storage in a ROM, a different key can be used for each RON program, for example. For storage in a programmable read-only memory, such as an EEPROM or a flash memory, an individual key can be input for each data-processing device. Naturally, it is necessary to store in the memory, in any form, which data associated with a key is stored at which addresses in the data memory or in the data-processing device.

In accordance with an additional feature of the invention, at least one register connected to the encryption unit, wherein the at least one secret key is written to the register after a positive comparison in the comparator. The register (s) temporarily stores the secret key(s). However, it is necessary to ensure that, after the data-processing device has been switched off, the register is erased. Advantageously, then, the registers are designed as volatile memories.

In accordance with another feature of the invention, a circuit implementing a one-way function connected at an input of the comparator for passing the keyword input by the user to the comparator, and wherein the at least one secret key is stored in a form encrypted using the one-way function. This is a particularly advantageous embodiment of the invention. One-way function coding cannot be decoded or can be decoded only with an immense amount of effort. The semiconductor chip which contains the data-processing device according to the invention therefore has only a coded form of the secret keys which does not enable the data stored in encrypted form to be decrypted. This means that even a very complex detailed investigation of the semiconductor chip does not allow all the relevant information for misuse to be obtained.

Only after a keyword has been input by a user, this keyword has been coded using the one-way function circuit in the data-processing device, and the coded keyword has been compared positively with the secret number stored in coded form is the uncoded keyword written to a volatile register and available there for decryption and encryption of the memory contents of the data-processing device by means of the encryption unit. After the data-processing device has been turned off, the keyword is erased.

In accordance with a further feature of the invention, an address decoder is connected to the processing unit and the encryption unit, the address decoder rendering encryption or decryption of data dependent on an address called by the processing unit.

In accordance with again an added feature of the invention, there are used a plurality of secret keys, and a respectively current key of the plurality of secret keys is selectable with an address decoder as a function of an addressed memory area.

In one development of the data-processing device according to the invention, different keys are used for different address ranges in the memories. For this, an address decoder is provided which stores the corresponding address ranges and the associated key registers.

If a plurality of keys are used, it is also necessary for the user, or, in the case of multiple-user systems, the users, to input a plurality of keywords in order to enable decryption of the stored data. These keywords are then located in the registers after positive comparison with the stored coded keys and can be selected from there by means of the address decoder, for example.

Correct operation of the data-processing device according to the invention is possible only in conjunction with a reader into which a user can input the keyword, which only the user knows—for example using a keypad. The keyword is transmitted from there to the data-processing device. Advantageously, the data-processing device is disposed in a smart card.

With the above and other objects in view there is also provided, in accordance with the invention, a data-processing system, which includes a data-processing device as summarized above and a reader adapted to communicate with the data-processing device. The reader includes an input means for input of the keyword by the user.

In accordance with a concomitant feature of the invention, the data-processing device is a component part of a smart card and the reader is a card reader with contactless and/or direct contact data/energy transfer.

Other features which are considered as characteristic for the invention are set forth in the appended claims.

Although the invention is illustrated and described herein as embodied in an electronic data-processing device and system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a detailed block diagram of the electronic data-processing device according to the invention.

DESCRIPTION OF THE PREFERRED EMBODIMENTS

Figure 1:
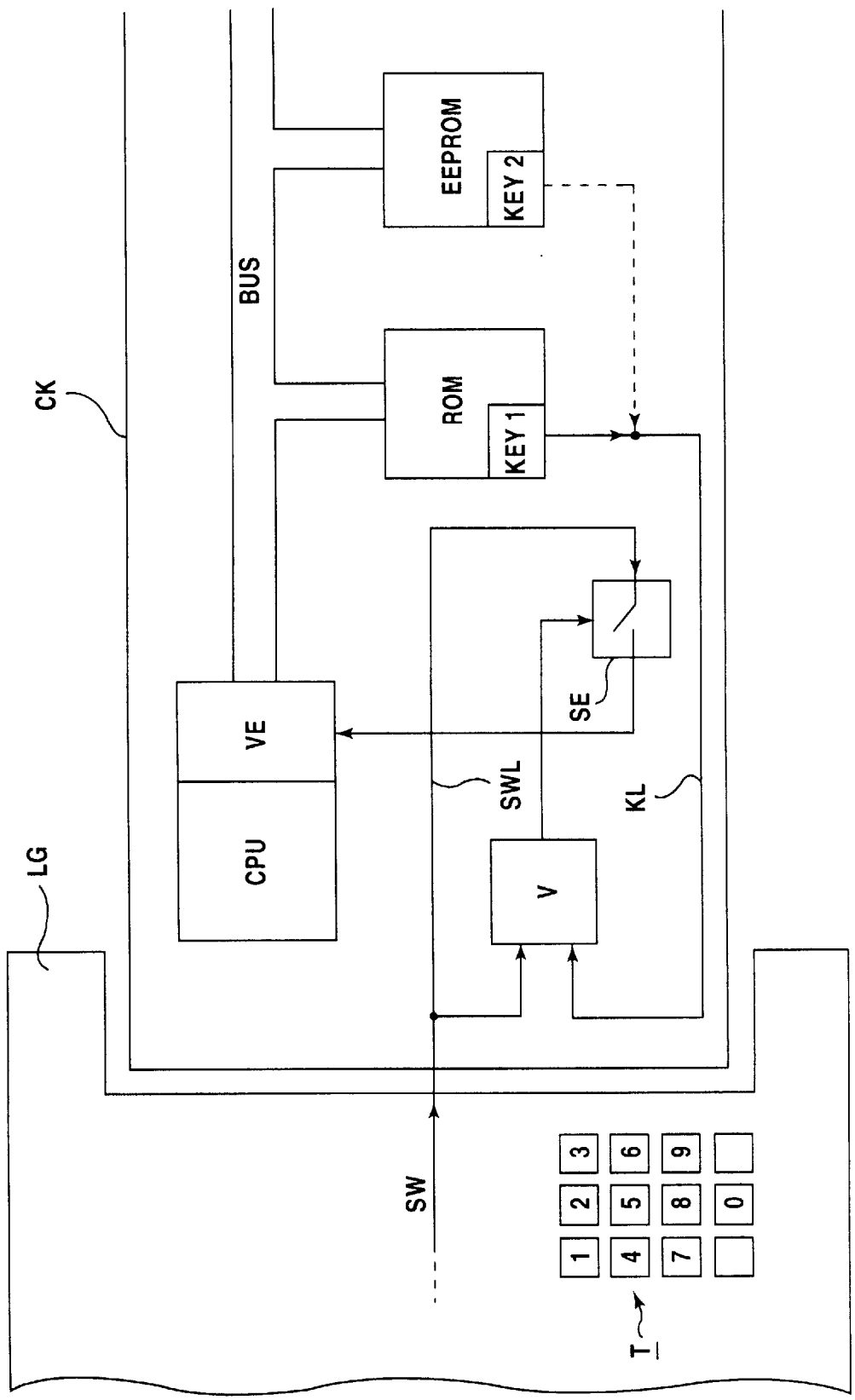
FIG. 1 is a partial diagrammatic illustration of a data-processing system according to the invention.

Referring now to the figures of the drawing in detail and first, particularly, to the highly schematic illustration of FIG. 1, there is seen a data-processing system according to the invention with a reader LG and a smart card or chip card CK which is inserted into the former. It will be understood that the invention is not restricted to the type of form of card for a data-processing device, however, but can also be implemented using other devices such as keys or wristwatches, for example. Information can be transmitted from the reader LG to the smart card CK through direct contact and/or without contact by contactless transmission.

The reader LG has a keypad T into which a user can input a keyword or password SW. The keyword SW is then transmitted from the reader LG to the smart card CK.

The smart card CK houses a semiconductor chip which contains a data-processing device according to the invention. The data-processing device has a CPU which is connected to memories ROM, EEPROM via a bus. Naturally, the bus can also have other circuits connected to it which are necessary or advantageous for a microcomputer to operate. The CPU has an encryption unit VE associated with it. The memories ROM, EEPROM store, in coded form, at least that data which is relevant for the security of the electronic data-processing device. In order to be able to process it in the CPU, this data needs firstly to be decrypted by the encryption unit VE using a secret key. Data which is to be stored in the memories ROM, EEPROM can be encrypted by the encryption unit VE before storage.

The encryption unit VE encrypts and decrypts the data using one or more secret keys Key1, Key2. These keys are stored in one or more of the memories ROM, EEPROM. However, encryption or decryption cannot take place until after a keyword SW has been input by a user using the keypad T on the reader LG and has been transmitted to the electronic data-processing device in the smart card CK. The electronic data-processing device has a comparator V to which both the keyword SW and, via a line KL, a stored secret key Key1, Key2 are supplied. Only if the comparison is positive, i.e. only if the keyword SW which has been input corresponds to the secret key Key1, Key2, is the keyword SW supplied to the encryption device VE via a line SWL and a switching device SE which is driven by the comparator V. The comparator V can also be implemented by the CPU.

As shown in FIG. 2, the encryption unit VE can be allocated registers R1, R2, . . . Rj to which the one keyword, or the plurality of keywords SW assigned to the stored secret keys, is/are written by means of a multiplexer MUX. In this case, the multiplexer is driven by the comparator V and represents a development of the switching device SE shown in FIG. 1. When there are a plurality of keywords SW, it is possible, in one development according to the invention, for the respectively current one to be selected by means of an address decoder AD associated with the CPU. To this end, the address decoder AD is supplied with the address of the memory location currently being addressed in each case by the CPU, and the corresponding register R1 . . . Rj is selected on the basis of a table stored in the address decoder or elsewhere. The keyword SW stored in the selected register R1 . . . Rj is then used by the encryption unit VE for encryption or decryption.

Although the secret keys Key1, Key2 can be stored in uncoded form, it is particularly advantageous for them to be stored in coded form. A so-called one-way function OWF is preferably used for coding. Such a one-way function has the effect that, even if the function and result are known, the input value cannot be determined or can be determined only with an immense amount of computational effort. Since the semiconductor chip producing the electronic data-processing device according to the invention has only the coded form of the secret keys and encrypted data stored on it, it is not possible for a defrauder to obtain the original data. The one-way function OWF can again also be implemented by the CPU.

As also shown in FIG. 2, a keyword SW transmitted by the reader LG is supplied to the comparator V via a circuit OWF implementing the one-way function OWF. The comparator V then compares the coded forms of the stored secret key Key1, Key2 and of the keyword SW with one another, and the uncoded form of the keyword SW is written to one of the registers R1 . . . Rj via the line SWL and the multiplexer MUX only if the result of the comparison is positive. As already explained, the registers R1 . . . Rj are volatile, so that the uncoded form of the keyword SW is stored only during authorized operation of the smart card CK and is erased after operation has finished.

The electronic data-processing device according to the invention, or the data-processing system according to the invention, thus makes it possible to protect data stored in a semiconductor chip in a smart card against unauthorized access simply by means of authorized encryption and decryption.

I claim:

1. An integrated electronic data-processing device, comprising:
   at least one memory storing at least one secret key in encoded form, a processing unit, and a bus connecting said processing unit to said at least one memory;
   an encryption and decryption unit connected to said processing unit;
   a comparator connected between said at least one memory and said encryption and decryption unit for comparing the stored secret key with a keyword input by a user;
   a switching unit connected to and driven by said comparator, said switching unit driving said encryption unit and selectively enabling data to be stored to be encrypted and stored data to be decrypted only upon a positive comparison in said comparator; and
   said switching unit passing the keyword input by the user through to said encryption unit for encryption and decryption.

2. The data-processing device according to claim 1, wherein said at least one memory is a memory selected from the group consisting of a RON, an EEPROM, a flash memory, and a FRAM memory.

3. The data-processing device according to claim 1, which comprises at least one register connected to said encryption unit, wherein the at least one secret key is written to said register after a positive comparison in said comparator.

4. The data-processing device according to claim 1, including a circuit implementing a one-way function connected at an input of said comparator for passing the keyword input by the user to said comparator, and wherein the at least one secret key is stored in a form encrypted using the one-way function.

5. The data-processing device according to claim 1, which further comprises an address decoder connected to said processing unit and said encryption unit, said address decoder rendering encryption or decryption of data dependent on an address called by said processing unit.

6. The data-processing device according to claim 5, wherein said at least one secret key is one of a plurality of secret keys, and a respectively current key of said plurality of secret keys is selectable by means of said address decoder as a function of an addressed memory area.

7. A data-processing system, comprising a data-processing device according claim 1 and a reader adapted to communicate with the data-processing device, said reader including an input means for input of the keyword by the user.

8. The data-processing system according to claim 7, which further comprises a smart card and wherein said data-processing device is a component part of said smart card.

* * * * *